March 9, 1948.  T. BAILEY  2,437,312

CASTER FOR FURNITURE

Filed May 1, 1944

INVENTOR.
Theodore Bailey

BY *Victor J. Evans & Co.*

ATTORNEYS

Patented Mar. 9, 1948

2,437,312

UNITED STATES PATENT OFFICE 2,437,312

CASTER FOR FURNITURE

Theodore Bailey, Habana, Cuba

Application May 1, 1944, Serial No. 533,579

2 Claims. (Cl. 16—18)

This invention relates to a caster and it is one object of the invention to provide a caster having an endless tread member which takes the place of a wheel and permits a piano or other heavy piece of furniture to be easily moved from one place to another without scarring a floor or rug and also prevents depressions being formed in a floor or rug by a heavy piece of furniture resting in the same place for a considerable length of time.

Another object of the invention is to so mount the endless tread that it may move longitudinally very freely and thus allow a heavy piece of furniture to be easily pushed along a floor.

Another object of the invention is to so mount the endless tread band or belt that while it may move easily about drums at ends of a frame, it will be prevented from sagging between the drums so that flat contacting engagement with a floor for the full length of its lower flight is assured.

Another object of the invention is to so form side plates between which the endless tread moves that dust and dirt will be excluded and prevented from interfering with free rotation of the rollers and the drums which movably support the endless tread member.

Another object of the invention is to provide the frame of the caster with a spindle disposed vertically in off-center relation to the frame and thus allow the frame to turn and follow the direction in which it is desired to move the piece of furniture.

Another object of the invention is to so form the endless tread member that it will be very flexible but at the same time strong and not be liable to be torn when subjected to strains.

The invention is illustrated in the accompanying drawings wherein.

Figure 1:
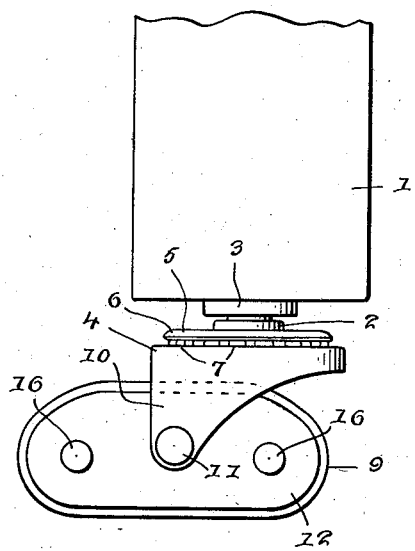
Figure 1 is a side elevation of the improved caster.

This improved caster is intended to be applied to a leg 1 of a heavy article of furniture and has a pintle 2 for fitting into a socket 3 where it is gripped and held in place, but may be pried loose by a screw driver or other suitable tool. This pintle has its lower end in swiveled engagement with a bracket 4 and above the bracket carries a fixed disc or bearing plate 5 having a race 6 about its marginal edge to receive bearing balls 7 which also engage in a companion race 8 formed in the bridge portion of the bracket 4. Since the disc 5 is stationary upon the pintle and the bracket loose, the bracket may turn freely about the pintle.

Figure 2:
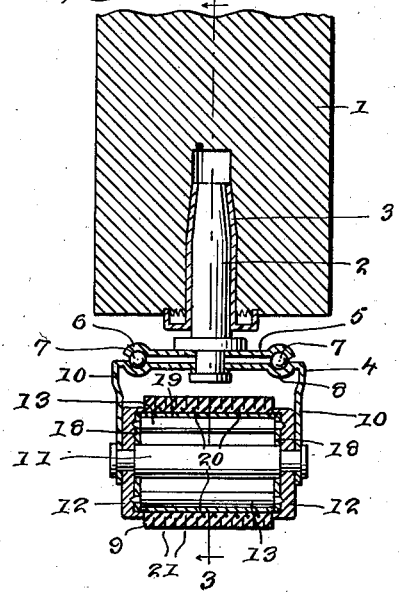
Figure 2 is a vertical sectional view taken transversely through the caster along the line 2—2 of Figure 3.
Figure 3:
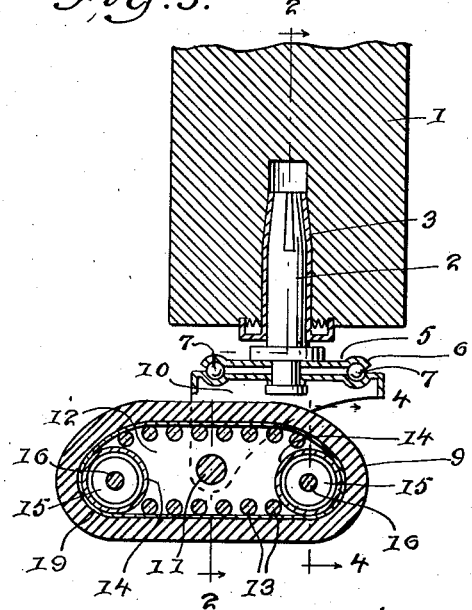
Figure 3 is a vertical sectional view taken longitudinally of the improved caster along the line 3—3 of Figure 2.
Figure 4:
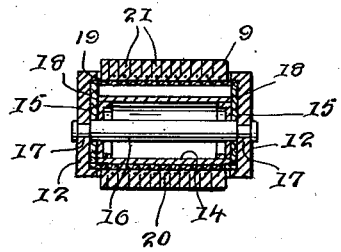
Figure 4 is a transverse sectional view taken along the line 4—4 of Figure 3.

The bracket straddles an endless tread member 9 and mounting therefor, and upon referring to Figure 1 it will be seen that the side arms 10 of the bracket are of triangular shape and formed with openings at lower ends of their depending end portions so that when ends of the shaft 11 are mounted through these openings the center for the tread member and its mounting will be offset with respect to the pintle and the frame caused to readily turn about the pintle and follow the path in which furniture is moved. The tread member or band 9 extends between side plates 12 with its upper and lower flights in contact with rollers 13 which are mounted between upper and lower edge portions of the side plates, and the tread band also engages about drums 14 at ends of the side plates. Each drum has a cylindrical body at ends of which are heads or caps 15 formed with center openings to receive the shafts 16. The shafts of the drums have their end portions projecting therefrom and mounted through openings 17 formed in the side plates, and in order to seal the edges and space the drums from the side plates so as to permit the drums to turn freely, there have been provided liners 18 which fit about the shafts and over the inner surfaces of the side plates. The tread band is formed of rubber or other suitable pliable material applied to a fabric base 19 and reinforced by a suitable number of wire strands 20 which may be single strands or in the form of wire mesh, and referring to Figures 2 and 4 it will be seen that the tread band is provided with a number of transversely spaced slits 21 which extend partially through the band and divide the floor engaging surface into strips. Also referring to Figures 2 and 4 it will be noted that extending edges 22 of the fabric base are positioned under inwardly extending lips 23 of the side plates 12 whereby the said lips coact with the reinforcing wire strands or mesh to prevent accidental sidewise displacement of the tread when a caster is pulled toward one side and before it has an opportunity to turn to follow the direction of the pull. By the slots 21 added flexibility will be imparted to the tread band and it will be less liable to crack when in use. The fact that the caster has an enlongated tread band is important as this distributes pressure over an elongated area instead of at a single spot and a depression will not be formed in a floor. This also prevents a groove from being formed in a floor when a heavy piece of furniture is pushed across a floor. Since the shaft 11 is offset with respect to the stem 2, the bracket will turn readily when guiding the furniture across a floor.

What is claimed is:

1. In a caster for furniture and the like, the combination, which comprises, a pintle having downwardly positioned offset arms having a transversely disposed shaft carried in the lower ends of the arms, side plates positioned between the arms and mounted on the shaft at a point midway of the length of the side plates, drums positioned between the said side plates and rotatably mounted in the ends thereof, an endless elastic tread band having a fabric base trained over the drums with the fabric base positioned between the edges of the side plates, idler rollers also positioned between the side plates and rotatably mounted therein providing supporting means for the endless tread band between the drums, said endless tread band having transversely spaced longitudinally disposed slits extending from the outer surface partially therethrough dividing the outer portion of the band into strips, and wire reinforcing elements embedded in said elastic tread band between and coacting with the edges of the side plates for retaining the tread band in operative position and preventing accidental separation thereof from the drums and rollers when the caster is drawn laterally.

2. In a caster for furniture and the like, the combination, which comprises, a pintle having downwardly positioned offset arms having a transversely disposed shaft carried in the lower ends of the arms, side plates with inwardly projecting lips on the edges thereof positioned between the arms and mounted on the shaft at a point midway of the length of the side plates, drums positioned between the side plates and rotatably mounted in the ends thereof, an endless elastic tread band having a fabric base with extending edges trained over the drums, idler rollers also positioned between the side plates and rotatably mounted therein providing supporting means for the endless tread band between the drums, the outer surfaces of the idler rollers and drums spaced from the inner surfaces of the lips at the edges of the side plates providing a track for the fabric base of the endless tread band, said endless elastic tread band having transversely spaced longitudinally disposed slits extending from the outer surface partially therethrough dividing the outer portion of the band into strips, and wire reinforcing elements embedded in said elastic tread band between and coacting with the said lips of the side plates for retaining the tread band in operative position and preventing accidental separation thereof from the drums and rollers when a caster is drawn laterally.

THEODORE BAILEY.

REFERENCES CITED

The following references are of record in the file of this patent:

UNITED STATES PATENTS

| Number | Name | Date |
|---|---|---|
| 889,946 | Miller | June 9, 1908 |
| 1,066,754 | Rison | July 8, 1913 |
| 1,294,200 | Tritton | Feb. 11, 1919 |
| 1,345,622 | Nack | July 6, 1920 |
| 2,055,932 | Kitchen | Sept. 29, 1936 |